Aug. 19, 1969  R. H. HUNGER ET AL  3,461,929
DEEP SNOW BUTT SHEAR APPARATUS
Filed July 25, 1967  3 Sheets-Sheet 1

INVENTORS
RICHARD H. HUNGER
CHARLES L. WHITING
REINO SUOJANEN

Dugger Peterson Johnson + Westman
ATTORNEYS

Aug. 19, 1969 R. H. HUNGER ET AL 3,461,929
DEEP SNOW BUTT SHEAR APPARATUS
Filed July 25, 1967 3 Sheets-Sheet 2

INVENTORS
RICHARD H. HUNGER
CHARLES L. WHITING
REINO SUOJANEN

Dugger, Peterson, Johnson & Westman
ATTORNEYS

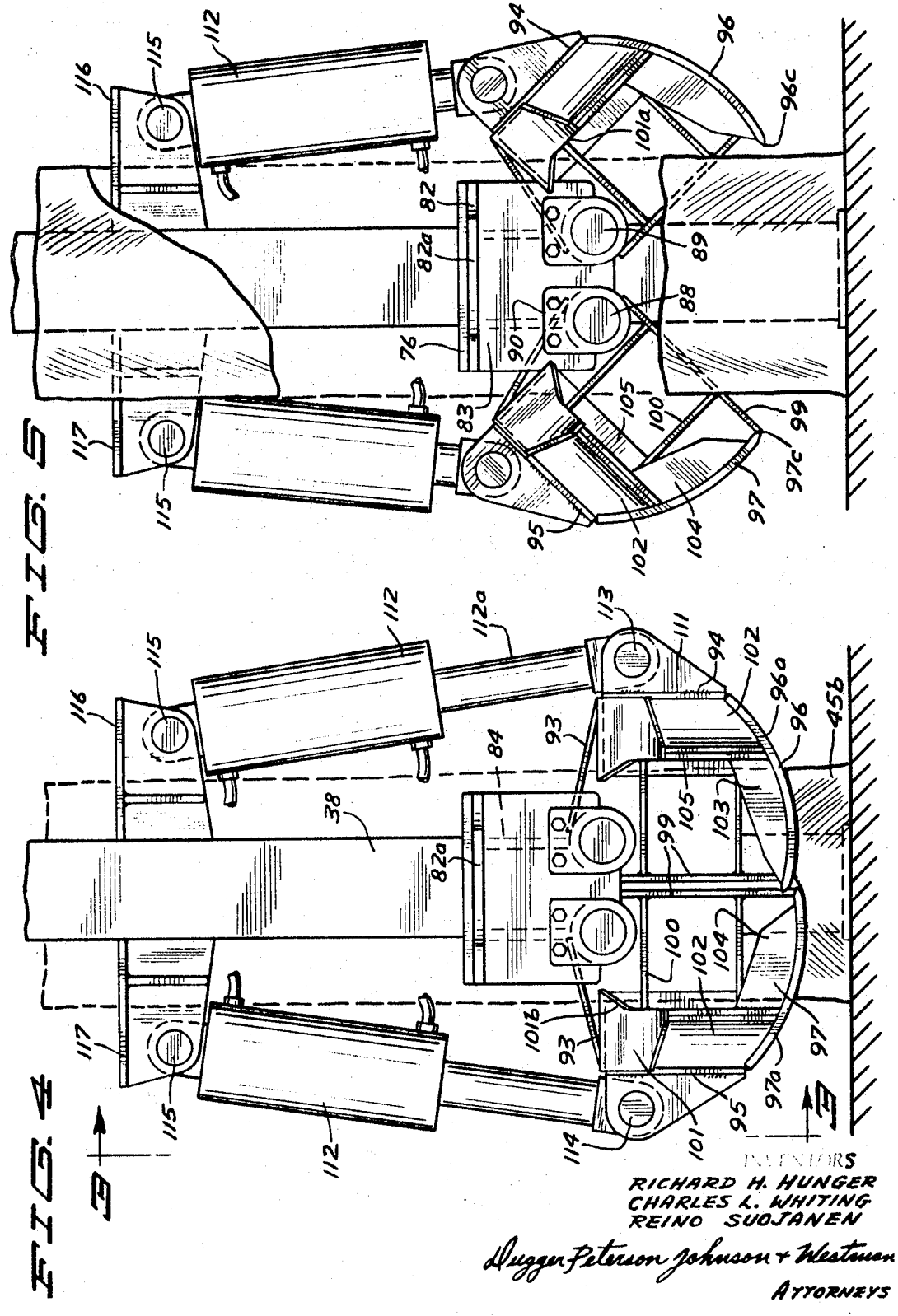

ical Cl. B27b 23/00

3,461,929
DEEP SNOW BUTT SHEAR APPARATUS
Richard H. Hunger, Dubuque, Iowa, and Charles L. Whiting and Reino Suojanen, Ashland, Wis., assignors to Beloit Corporation, Beloit, Wis., a corporation of Wisconsin
Filed July 25, 1967, Ser. No. 655,812
Int. Cl. B27b 23/00
U.S. Cl. 144—34　　　　　　　　　　　　　14 Claims

ABSTRACT OF THE DISCLOSURE

Apparatus for delimbing and severing standing trees including a mobile vehicle having boom mechanism for positioning a standard and a mast movably relative thereto adjacent the tree. Delimbing and clamping mechanism is movably mounted on the mast while mechanism is mounted on the standard for severing a tree. The severing mechanism includes arcuate blades mounted for movement about horizontal axes to sever a tree, the severing mechanism including means which in conjunction with clamping mechanism retain the severed tree against any substantial movement relative the mast as the tree is swung to a piling position.

Background of the invention

The apparatus of this invention is for severing a standing tree and acts in cooperation with delimbing and clamping mechanism for retaining the severed tree in condition to be properly swung to a piling position.

In prior art tree severing mechanism, for example, U.S. Patent 3,183,954, a pair of blades are mounted on a platform for movement about vertical axes. Such a platform has a relatively large ground contact area; and when it is desired to use such prior art mechanism in relatively deep snow, the relatively large plan area of such mechanism limits the depth that the mechanism can penetrate the snow. As a result a relatively tall stump is left, provided time is not taken to clear away the snow. Also with such prior art severing mechanism, the blades are of a relatively wide transverse width, and due to the fact that such blades are moved only in horizontal planes during the tree severing operation, one of the blades cannot be extended between two closely adjacent trees to sever one of the trees. In order to overcome the aforementioned problems as well as others, this invention has been made.

Summary of the invention

The invention includes a pair of severing blades that are arcuate in transverse cross section and are mounted for movement about parallel horizontal axes whereby the cutting edges travel in an arc. Accordingly, the blades in an open condition present a minimum area to contact snow and permit positioning between two trees that have grown close together. Also ground contact area of the apparatus is reduced from that of prior art apparatus.

Brief description of the drawings

FIGURE 4 is a front view of the apparatus of FIGURES 2 and 3, said view being generally taken along the line and in the direction of arrows 4—4 of FIGURE 2; and FIGURE 5 is a view that is the same as FIGURE 4 other than the cutting blades are shown in an open condition.

Referring now to FIGURE 1, there is illustrated a vehicle, generally designated 10, which is of a crawler type having tracks 11 operated by wheels 12. A swingable platform 13 is mounted on a chassis frame 14 which in turn is supported upon the above mentioned wheels and tracks. A motor 15 for supplying hydraulic pressure and motivating force to the vehicle is mounted on the rear portion of the platform 13. Power means 16 is supplied to rotate the platform together with the delimber and severing apparatus disposed thereon. A cab 17 is provided on platform 13 for an operator. A mounting base 18 is secured to the medial area of the platform 13 and has pivotally secured thereto at 19, an articulated reach boom assembly generally designated 20. The reach boom assembly has a rear boom section 21 pivotally connected to pivot 19 and an upwardly extending arm portion 22. A hydraulic actuator 23 is pivotally secured at 24 to platform 13 and is pivotally secured at 25 to the reach boom as shown. Hydraulic actuator 23 may be a conventional cylinder-piston assembly that is extensible and retractable by means of hydraulic pressure through means not shown.

Figure 1:
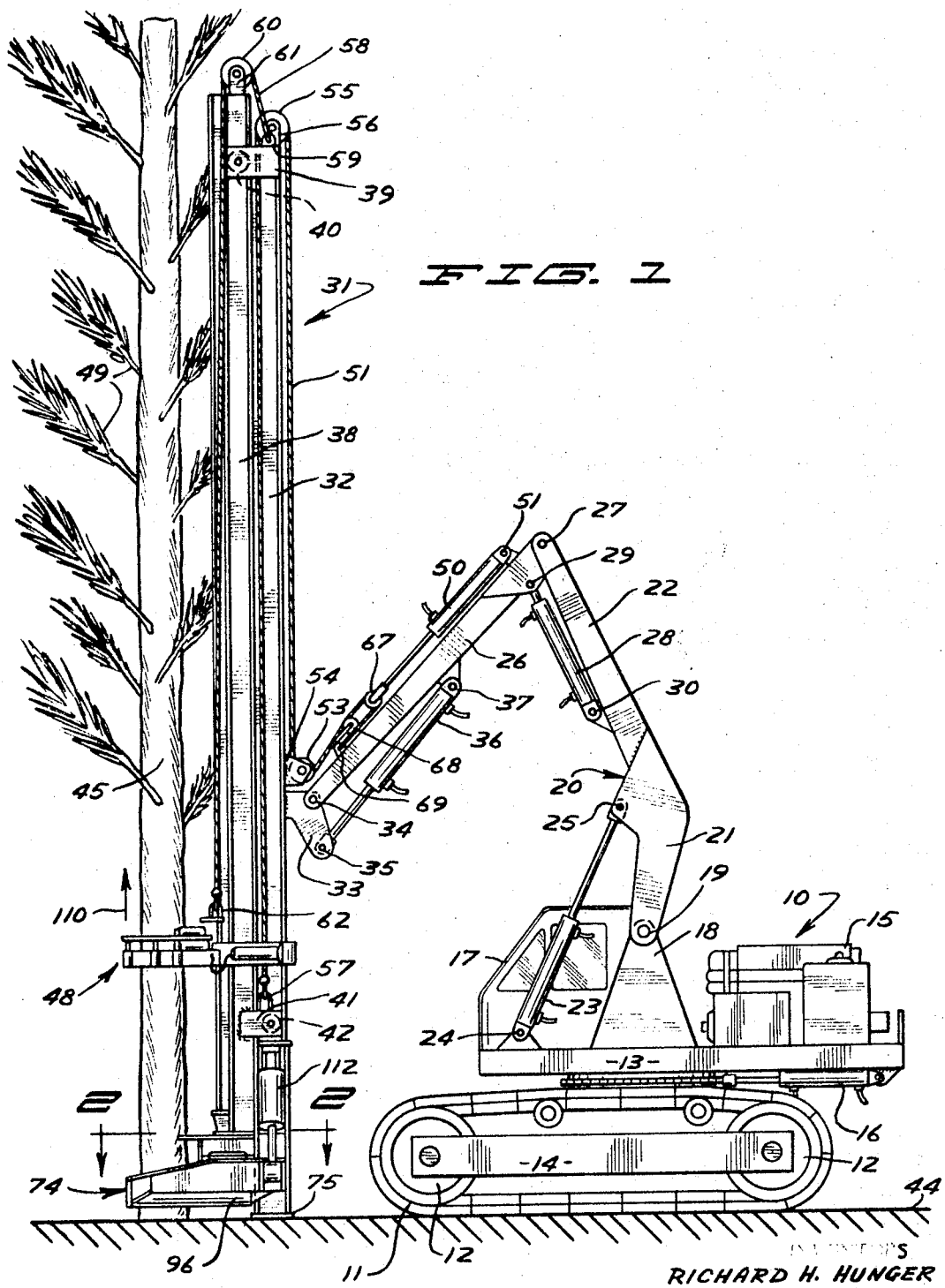
FIGURE 1 is a side elevation of the complete apparatus for delimbing, topping and felling a standing tree with the cutting blades in a closed condition even though the cutter head and clamping assembly normally has delimbed the tree and is at a relatively higher position.

A second arm or boom 26 is pivotally mounted at 27 to the forward end of arm 22 and may be rotated about pivot 27 by means of a hydraulic actuator 28 that is pivotally secured at 29 to the boom 26 and also at 30 to the reach boom arm 22.

Carried at the end of the boom 26 of the reach boom assembly 20 is a sliding mast and standard assembly, generally designated 31. The standard 32 of assembly 31 is secured to a crank 33 to effect the mount thereof through pivot connection 34 at the end of the boom 26. Crank 33 is also pivotally secured at 35 to hydraulic actuator 36 which in turn is pivotally mounted at 37 to the end boom 26. The mast 38 of assembly 31 may comprise an I-beam or similar structure which is slidably mounted at the forward end of the standard 32. A bracket 39 is secured to the upper end of standard 32 and may be provided with rollers 40 to cooperate with the mast 38 and permit the mast to slide upwardly and downwardly with respect to the standard 32 while being retained in proximity thereto. Similarly a bracket 41 may be secured in a rearwardly extending manner to the lower end portion of the mast 38 and may be provided with roller elements 42 for engaging the flange of the standard 32.

A cutter head and clamping assembly, generally designated 48, is secured to the lower portion of the mast 38 and is adapted to slide therewith and relative thereto vertically against the standard 32 when it is desired to remove the limbs 49 from the standing tree 45. The cutter assembly may be of a construction such as described in, for example, U.S. Patent 3,183,952; U.S. Patent 3,183,954; or U.S. Patent 3,183,952.

A number of mechanisms may be employed for effecting the extension of mast 38 with respect to the standard 32, FIGURE 1 showing a relatively simple means of accomplishing the such extension. That is, in FIGURE 1 there is illustrated a hydraulic actuator 50 having one end of the cylinder thereof pivotally connected at 51 to the second arm 26 and a piston rod connected to pulleys 67 for advancing and retracting said pulleys toward the pulleys 68 that are attached to arm 26 at 69. One end of the cable 51 is connected to member 69 and extended around pulleys 67, 68 to provide a number of runs therebetween; and thence trained about a pulley 53 which is rotatably mounted on a bracket 54 that is secured to the standard. Thereafter cable 51 extends upwardly along the rear side of the standard 32 and is trained about a pulley 55 rotatably mounted by bracket 56 at the upper end of standard 32. From this position, cable 51 extends downwardly to the lower end of the mast 38 where it is secured to anchor 57 which in turn is affixed to the bracket 41. It may be readily seen that the retraction of cable 51 will cause the entire mast 38 to be projected upwardly with respect to the standard 32 until bracket 41 abuts against the bracket 39.

A further cable 58 is anchored at 59 to the upper end of standard 32 and is trained over pulley 60 which in turn is rotatably mounted by bracket 61. Bracket 61 in turn is fixedly mounted at the top of the mast 38, the cable 58 extending downwardly from pulley 60 along the forward edge of the mast 38 and thence is anchored to the lift means 62 which in turn supports the cutter head assembly 48 as shown.

As described in U.S. Patent 3,183,952, the rise of the mast 38 through retraction of cable 51 causes the cutter head and clamping assembly 48 to rise with respect to the mast 38. Since the mast 38 is also rising with respect to the standard 32, there is a compound movement which will place assembly 48 at the top of the mast at about the same time the mast reaches the uppermost position with respect to the standard 32.

Figure 2:
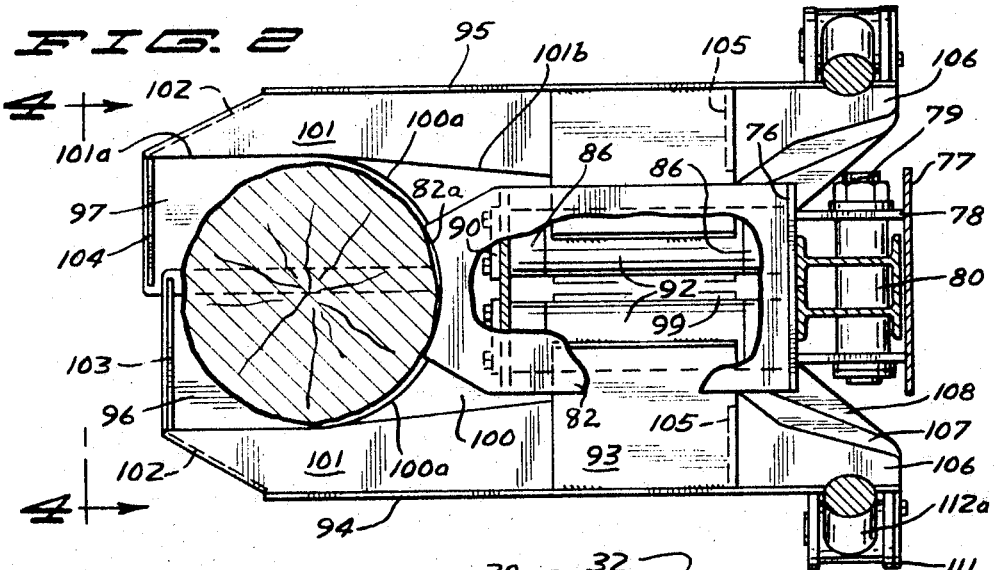
FIGURE 2 is an enlarged horizontal view of the apparatus of this invention generally taken along the line and in the direction of the arrows 2—2 of FIGURE 1, part of the mounting plate being broken away.

In order to amount the tree severing assembly, generally designated 74, there is provided a stand that includes a bottom plate 75, front plate 76, a back plate 77 and side plates 78 that are connected together to surround the lower end portion of the standard 32 with plates 76, 77 abutting against said standard. A pair of vertically spaced bolts 79 are extended through the side plates 78 and web portions of the mast, there being provided spacers 80 on each of said bolts, such as illustrated for the lower bolt in FIGURE 2. In order to mount the shearing blades 96, 97, the severing assembly includes a horizontal plate 82 having one edge secured to plate 76 and an opposite arcuately curved edge or notch 82a, such as shown in FIGURE 2. Dependently secured to plate 82 is a vertical, transverse plate 83, plate 83 being located a slight distance rearwardly of edge 82a and parallel to plate 76. Extending between plates 76, 83 and secured to plates 76, 82, 83 are a pair of transversely spaced, longitudinal mounting plates 84. Each plate 84 has a downwardly opening notch 85 to provide depending legs on which there are mounted longitudinally spaced annular mounting members 86. Members 86 open to appropriate notches (not shown) provided in plate 83. The annular mounts 86 on one plate 84 mounts an axially elongated shaft 88 while the other pair of mounts 86 mount a corresponding axially elongated shaft 89. Thus shafts 88, 89 are mounted to extend horizontally and parallel to one another in a longitudinal direction.

Retainer plates 90 are bolted on plate 83 for removably retaining shafts 88, 89 within their respective pair of mounts 86. On each of the shafts 88, 89 is rotatably mounted an annular mount 92 that is longitudinally intermediate with respect to said annular mounts 86. Each mount 92 has one edge of the mounting plate 93 welded thereto such that each plate extends generally tangentially relative the respective mount. The plates 92 extend generally transversely away from one another, the opposite edge of each plate being welded to the upper edge of a longitudinally elongated bracket 94 and 95 respectively. The trailing edge of the severing blade 96 is welded to the lower edge of bracket 94 while the trailing edge of severing blade 97 is welded to bracket 95. Each of the severing blades in transverse cross section is arcuately curved, the radii of curvature of the inner and outer surfaces of blade 97 being from the central axis of shaft 88 while the radii of curvature for the corresponding surfaces of blade 96 extend from the central axis of shaft 89. Further the radii of curvature of blade 96 is slightly greater than that of blade 97 whereby when the blades are moved to the tree sheared position of FIGURE 5 the cutting edge 96c of plate 96 overlaps and is vertically above the cutting edge 97c of plate 97 such as shown in FIGURE 5. Accordingly bracket 94 is slightly shorter in height than bracket 95.

A mounting plate 99 has one edge affixed to blade 97 and an opposite edge affixed to the annular mount 93 such that plate 99 extends parallel to bracket 95. Correspondingly a second plate 99 has one edge affixed to blade 96 and to the corresponding mount 93 to extend parallel to plate 94 when the blades are in the closed position of FIGURE 4. Between each of bracket 95 and the adjacent plate 99, and bracket 94 and the adjacent plate 99, there are provided a pair of spaced reinforcing plates 100 that extend generally perpendicular relative to the respective mounting plate 99.

Welded to the forwardly and downwardly inclined edge of each of brackets 94 and 95 to extend toward the other bracket is a retainer plate 101, the retainer plates having adjacent generally parallel forward longitudinal edge portions 101a and rearwardly inclined edge portions 101b that are inclined to extend toward the other plate 101.

Each of the blades 96, 97 has a forwardly transversely inwardly inclined edge portion 96a, 97a respectively; there being a similarly inclined vertical reinforcing plate 102 welded to the respective blade edge portion, said forward edge portion of brackets 94, 95 respectively, and to the adjacent retaining plate 101. A vertical, transversely extending retainer plate 103 has its lower edge welded to blade 96 and a vertical edge welded to adjacent plate 102 while a corresponding but oppositely faced plate 104 is likewise welded to blade 97 and adjacent plate 102. Reinforcing plates 103, 104 extend adjacent to the cutting edge of the respective blade, are longitudinally offset as shown in FIGURE 2, and are of a maximum height terminating vertically intermediate blade 97 and plate 101, and blade 96 and plate 101 respectively. A transverse vertical plate 105 is provided for each of the severing blades and welded thereto, and to the rear edges of the respective pair of horizontal retaining plates 100. Each set of plates 100 is oppositely faced from the other set and has an arcuately curved edge 100a that has a radius of curvature slightly greater than notch 82a. The center of curvature for notch 82a and edges 100a is generally the vertical center axis of the maximum diameter tree to be severed. Plates 100 in part underlie plates 101 and 82. A top, rearward horizontal plate 106 is welded to each of the plates 105 and to the brackets 94, 95 respectively as is an intermediate reinforcing member 107. Additionally, to each of the blades and its bracket 94, 95 respectively, there is welded a bottom, rearward reinforcing member 108. Additional reinforcing members (not shown) may be provided other than that none extend into the space that is bound on the bottom by blades 95, 96; longitudinally horizontally between plates 103, 104 and notch 82a; and transversely between plates 101 at a location forwardly of plates 82 when the blades are in a closed position.

Figure 3:
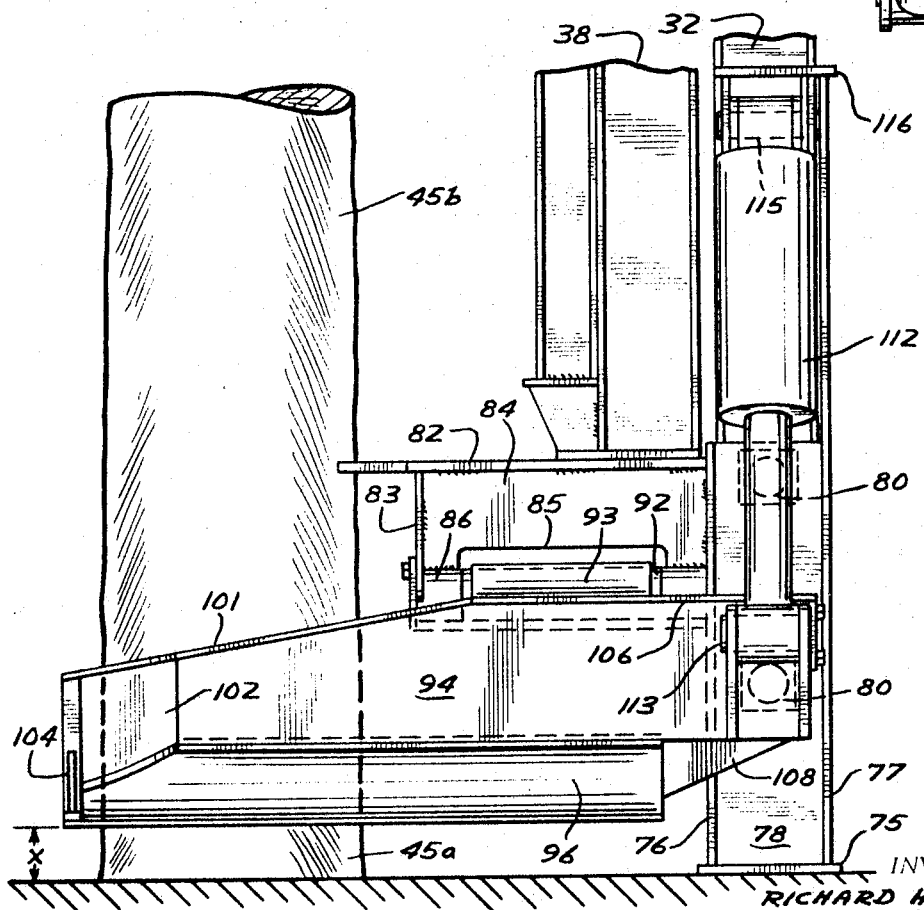
FIGURE 3 is an enlarged side view of the apparatus of this invention with the blades in a closed condition, said view being generally taken along the line and in the direction of the arrows 3—3 of FIGURE 4.

To the rearward edge portion of each of the brackets 94, 95 there is welded a clevis pivot bracket 111, one bracket 111 having the piston rod 112a of a hydraulic actuator 112 connected thereto by a pivot member 113 while a corresponding hydraulic actuator 112 is pivotally connected to the other pivot bracket by a pivot member 114. At an elevation substantially higher than mounting plate 84, a bracket 116 is affixed to mast 32 to extend transversely outwardly therefrom, bracket 116 having the cylinder of one of the actuators 112 pivotally connected thereto by a pivot member 115. Bracket 117 is mounted on the mast 32 to extend transversely outwardly therefrom in a direction opposite bracket 116, the cylinder of the other hydraulic actuator being pivotally connected to bracket 117 by a second pivot member 115. When the hydraulic actuators 112 are in their retracted position of FIGURE 3, the shearing blades have been pivoted about the pivot axes of shafts 88, 89, respectively to positions that their cutting edges are substantially transversely spaced from one another. However, upon applying fluid under pressure to the opposite ends of the actuators, the shearing blades are pivoted about their respective shafts to move their cutting edges downwardly and toward one another to the position of FIGURE 1 wherein the cutting edge of the blade 96 overlays the cutting edge of the blade 97 such as shown in FIGURE 4.

The structure of the invention having been described, the use will now be set forth. To perform a complete operation upon the standing tree 45, the standard and mast assembly 32, 38 will be brought into vertical alignment and adjacent the tree trunk such as illustrated in FIGURE 1. The severing assembly 48 will encircle the tree while the shearing blades will be in their opened condition to extend alongside the tree such as illustrated in FIGURE 5 with the notch portion of the mounting plate abutting against the tree. At this time the hydraulic actuator 50 is operated whereby cable 51 is caused to pull the cutter head 48 to move upwardly in the direction of arrow 110 to delimb and thereafter top the tree in the manner such as described in U.S. Patent 3,183,952. Subsequently hydraulic actuator 50 is operated whereby the cutter head assembly is moved to an intermediate position to firmly clasp the tree. Now the hydraulic actuators 112 are operated to move the piston rods from the retracted position of FIGURE 5 to the extended position of FIGURE 4. As a result the shearing blades are pivoted about their respective shafts 88, 89 to the position of FIGURE 4 to sever the tree. The stand 75-78 in abutting against the ground will result in a predetermined height stump being left.

After the tree has been sheared, hydraulic actuators 23, 28, 36 may be operated to move the severed tree to be lowered to the ground by means of the vehicle and boom mechanism. In this connection it is to be noted that retaining plates 103, 104 will prevent the lower end of the trunk of the severed tree from moving forwardly off of blades 96, 97; retaining plates 101 preventing the lower end of the trunk from moving transversely; and the notch portion 82a of the mounting plate and edges 100a preventing the trunk from moving rearwardly. As may be seen from FIGURE 2, edges 100a are curved such that the curved edges in a longitudinal forward direction are progressively further transversely spaced. Thus edges 100a, 100a, 82a in plan view extend in close proximity to and around only the back half of the tree. Accordingly, the cutter head assembly 48 and the shearing mechanism of this invention retains the severed tree as it is being swung into a piling position. After the severed tree has been swung into a piling position, cutter head assembly 48 and the shearing blade mechanism is operated to drop the severed tree.

With the severing mechanism illustrated, that is suitable for severing a 20″ diameter tree, the stand 75-78 maintains the blades to have a lowermost elevation of 4″ above the ground. However, to suit variable ground conditions and different types of timber, the stand 75-78 may be made of a construction that the height of the blades above ground in a given condition may be varied.

One advantage of this invention over prior art tree severing mechanism is that the ground contact area is reduced. For example, with prior art mechanism suitable for severing a 20″ diameter tree, the ground contact area of the blades and means for mounting the blades was 2,614 square inches. However, with the apparatus of this invention the ground contact area of the blades is reduced to 1,024 square inches, the mechanism for mounting the blades being at higher elevation than the cutting edges of the blades in an open condition. With the apparatus of this invention, the severing mechanism will penetrate at least four feet of snow and shear a tree within 12 inches of the ground. However, prior art butt shears for shearing the same diameter tree, depending on the water content of the snow, will leave a 24 to 36 inch stump in four feet of snow. The better penetration of snow by the apparatus of this invention is in part obtained since when the blades are in an open condition they present a minimum area to contact the snow.

A further advantage derived from the cutting blades traveling in an arc is that the wood fibers sever easier. Additionally, since the severing blades in an open condition are of a relatively narrow horizontal width, the blades can be positioned between two trees that have grown closely together.

The embodiments of the invention in which an exclusive property or privilege is claimed are defined as follows:

1. For severing a standing tree, a first and a second blade each having a cutting edge, and means for mounting and moving said blades about spaced horizontal axes between an opened condition that the blades, including the cutting edges, are transversely spaced from one another by a distance greater than the diameter of the tree to be severed and a closed position that the cutting edges are closely adjacent one another to have severed a tree, said mounting and moving means including a first and a second axially elongated shaft, means for mounting said shafts in horizontally extending, parallel relationship, means connected to the first blade for mounting it on the first shaft for arcuate swinging movement about the first shaft axis between the first blade opened and closed positions, and means connected to the second blade for mounting it on the second shaft for arcuate swinging movement about the second shaft axis between the second blade opened and closed positions, said blades in section perpendicular to the respective shaft axis of the shaft on which the blade is mounted being arcuately curved about the said respective axis.

2. The apparatus of claim 1 further characterized in that the blade mounting means and blades have retainer members that are abuttable against the lower end portion of the tree to hold the lower end portion against any substantial horizontal movement relative the blades when the blades are in a closed position.

3. The apparatus of claim 1 further characterized in that the blade mounting and moving means includes a vertically elongated member having opposite transverse portions, said shaft mounting means being mounted on said vertical elongated member to position said shafts to extend forwardly thereof, a first piston cylinder combination, means for removably pivotally connecting one end of said first combination to one transverse portion of the vertically elongated member at a higher elevation than said shafts, a second piston cylinder combination, means for removably pivotally connecting one end of said second combination to the other transverse portion, means for pivotally connecting the other end of the first combination to the first blade, and means for pivotally connecting the other end of the second combination to the second blade, said piston cylinder combinations being extensible and retractable for moving the blade between said positions.

4. The apparatus of claim 1 further characterized in that each blade is of a substantially greater length than its arcuate dimension, and that said vertical member has a lower end portion at a substantially lower elevation than the lowermost portions of said blades in a closed position.

5. Apparatus for severing a standing tree including a vertical standard having a lower end portion, a longitudinally elongated mounting frame mounted on the standard to extend forwardly thereof, a pair of longitudinally extending, transversely spaced shafts mounted on said frame in depending relationship thereto, a first longitudinally elongated tree severing blade having a cutting edge, a second longitudinally elongated tree severing blade having a cutting edge, means mounting the first blade on one of said shafts for pivotal movement about the axis of said one shaft, means mounting the second blade on the other of said shafts for pivotal movement about the axis of the other shaft, said blade mounting means mounting the blades with their cutting edges facing one another and the blades to extend a substantial distance forwardly of said frame, said blades in transverse cross section being arcuately curved about the respective shaft axis, and means mounted on the standard and connected to the blades for moving the blades between a closed position that the cutting edges are adjacent one another and an opened position that the blades, including their cutting edges, are transversely spaced from one another by a distance greater than the diameter of the tree to be cut, and means mounted on the standard and connected to the blade mounting means for operating said blades between said positions.

6. The apparatus of claim 5 further characterized in that said blade operating means includes a first bracket secured to one transverse side of said standard to extend transversely away therefrom, a piston cylinder combination extended between and connected to the first bracket and the first blade mounting means for operating the first blade, a second bracket secured to the other transverse side of said standard to extend tranversely away therefrom and a piston cylinder combination extended between and connected to the second bracket and the second blade mounting means to operate the second blade.

7. The apparatus of claim 5 further characterized in that each blade has a forward edge portion, that a transversely, upwardly extending retainer member is mounted on each blade forward edge portion and that the frame has a forwardly opening notch, said notch and retainner members being longitudinally spaced by a distance to have the severed tree located therebetween.

8. The apparatus of claim 7 further characterized in that each blade mounting means includes a longitudinally extending retainer member located a substantial distance above the respective blade in ahe blade closed position, said longitudinally extending retainer members having adjacent edges extending longitudinally intermediate the notch and the transverse retainer members that are abuttable against the severed tree.

9. For being mounted on a vertically elongated standard, severing apparatus comprising a longitudinally elongated mounting frame mountable on the standard to extend forwardly thereof, a pair of longitudinally elongated severing blades each having a longitudinally extending cutting edge, means for dependingly mounting said blades on the frame for movement about horizontal axes between a closed position that the cutting edges are closely adjacent one another and an opened position that the cutting edges are remote from one another and the cutting blades extend a substantial distance forwardly of said frame, and means mountable on the standard and connected to the blade mounting means for moving the blades between their opened and closed positions.

10. The apparatus of claim 9 further characterized in that the blade mounting means includes a first pair of longitudinally spaced annular mounts dependingly secured to said frame, a second pair of annular mounts dependingly secured to said frame in transverse spaced relationship to said first pair of annular mounts, a longitudinally extending shaft mounted by each pair of mounts, first means mounted on one shaft for mounting the first blade for movement about the one shaft axis, and second means mounted on the other shaft for mounting the other blade for movement about the other shaft axis.

11. The apparatus of claim 9 further characterized in that the blades are arcuately curved in transverse cross section.

12. The apparatus of claim 9 further characterized in that the blade mounting means includes a first axially elongated shaft, a second axially elongated shaft, means for mounting said shafts in parallel, longitudinally extending, transversely spaced relationship on said frame, first means for mounting one blade on the first shaft to pivot about the first shaft axis, and means for mounting the other blade on the second shaft to pivot about the second shaft axis.

13. The apparatus of claim 12 further characterized in that the first blade is of a length to extend a greater distance longitudinally forwardly of the frame than the second blade, that each of the blades inner and outer surfaces are of radii of curvature extending generally from the respective shaft axis and that said first blade is mounted on said first means to have its radii of curvature of greater lengths than the radii of curvature of the second blade.

14. The apparatus of claim 13 further characterized in that each blade has a forward edge, that a transversely extending, vertical retainer plate is mounted on each blade adjacent its forward edge to extend away from the respective blade in a direction generally toward the respective shaft axis, each retainer plate extending transversely adjacent the cutting edge of the blade on which it is mounted, and that said blade mounting means includes a retainer member having an arcuately curved edge a substantial distance longutidinally rearwardly of the vertical retainer plates and generally facing toward said retainer plates.

References Cited

UNITED STATES PATENTS

| | | | |
|---|---|---|---|
| 2,934,109 | 4/1960 | Bles | 144—34 |
| 3,353,575 | 11/1967 | Larson et al. | 144—309 |

GERALD A. DOST, Primary Examiner

U.S. Cl. X.R.

144—2